UNITED STATES PATENT OFFICE.

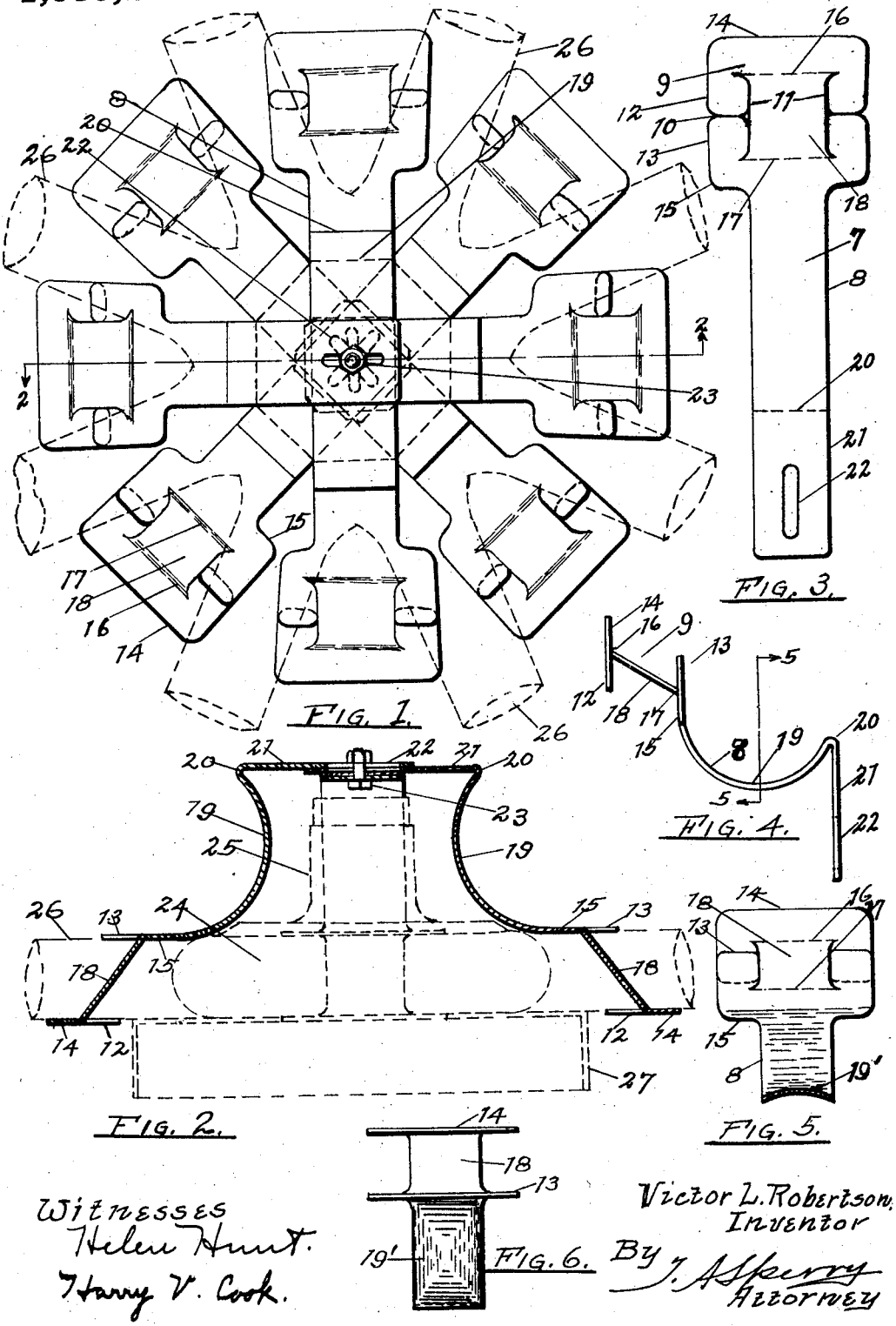

VICTOR L. ROBERTSON, OF REXBURG, IDAHO.

AUTOMOBILE-EXTRACTOR.

1,333,133.  Specification of Letters Patent.  Patented Mar. 9, 1920.

Application filed January 6, 1919. Serial No. 269,928.

*To all whom it may concern:*

Be it known that I, VICTOR L. ROBERTSON, a citizen of the United States, and a resident of the city of Rexburg, county of Madison, and State of Idaho, have invented certain new and useful Improvements in Automobile-Extractors, of which the following is a specification.

My invention relates to improvements in automobile extractors in general, and more particularly to that type of extractors employing a cable or other flexible element wrapping on a drum driven by the automobile motor.

A principal object of the invention is to provide a device that is easily portable within the body of the vehicle. A further object is to provide a device that may be readily applied to almost any make or size of vehicle. A further object is to provide a device composed of a plurality of essentially similar elements which may be readily assembled for use and disassembled and closely packed or nested for transportation, and a further object is to provide a device of great simplicity and manufacturing economy.

With these and other objects in view my invention relates to the general construction and details illustrated in the accompanying drawings, it being understood that I claim such modifications of the device and of its application as come within the spirit of the appended claims.

In the drawings:—Figure 1 illustrates an assembled elevation of the device on a fragmentary portion of a vehicle wheel the spokes of which are indicated by broken lines. Fig. 2 is a partial, sectional plan view taken on line 2—2 of Fig. 1. Fig. 3 is a view of one of the elements composing the device before same is bent or formed. Fig. 4 is a side elevation of one of the elements. Fig. 5 is a modified sectional elevation on line 5—5 of Fig. 4, and Fig. 6 is a plan view of the device as modified in Fig. 5.

In the drawings the numerals 7 indicates in general one of the elements of which the device is composed consisting of the body or shank 8 and the enlarged head 9 which is split laterally for a portion of its width, as at 10, and longitudinally for a portion of its length, as at 11, forming a plurality of lobes 12 on the outer portion of the head and a plurality of lobes 13 on the inner portion of the head, lobes 12 being connected by a flanged portion 14 formed by bending or folding the head on line 16, and lobes 13 being connected by a flanged portion 15 integral with body 8 formed by bending the element on line 17, flanges 14 and 15 being interconnected by the medial portion 18 of head 9.

The shank or body element 8 is formed arcuately as at 19 and folded backwardly as at 20 so the lower portion of the shank 21 is essentially parallel to flanges 14 and 15, the portion 21 being perforated by an elongated slot 22 to receive bolt 23. The numeral 24 indicates the hub of a rear wheel of a motor vehicle with its projection or cap 25 and plurality of radial spokes 26, 27 indicating a brake drum customarily attached to the rear wheel of the vehicle.

In operation a plurality of elements 7 are arranged radially around the wheel hub so that the lobes 12 and flange 14 are on the inner side of the radial spokes 26, the medial portion 18 lying between adjacent spokes 26 and lobes 13 and flange 15 contacting with the outer portion of said spokes and hub and are so arranged that the slots 22 in the various elements are assembled on bolt 23 which passes through the slots of all the various elements 7. These elements may be mounted between all the spokes of the wheel or between a portion of them only at the volition of the operator. When so assembled the arcuate portions 19 compose a drum surrounding the wheel hub or cap upon which a rope, cable, chain or other flexible element may be wrapped, the opposite end of said flexible element being fixedly attached to some immovable object exteriorly and preferably in advance of said motor vehicle.

As the rear wheels of said vehicle are revolved under the action of the vehicle motor the flexible element will be wound or wrapped around said drum composed of elements 19 and so cause the vehicle to be impelled forwardly regardless of the slippage that may occur between the tread of said wheels and the ground upon which they rest. It is understood that the arcuate portions 19 may be curved or embossed as shown at 19′ to produce a more nearly circular wrapping drum for said flexible element, if so desired. The cable or flexible element is not shown in the drawings as it, as such, forms no portion of this invention and may be of any desired form or character and any desired means of attaching same to elements 7 may be employed.

Having thus described my invention, what I claim as new and desire to protect by these Letters Patent is:

1. As a new article of manufacture, an automobile extractor composed of a plurality of essentially similar elements, each element being formed from a single piece of material, and having one end thereof mounted between adjacent spokes of a vehicle wheel, the other extremity of said elements being adjustably inter-connected beyond the hub of said wheel, by a single fastening member, the medial portions of said elements forming essentially a drum surrounding said hub.

2. In an automobile extractor the combination with a vehicle wheel, of a plurality of essentially similar elements so shaped and mounted on said wheel as to form essentially a drum surrounding said wheel hub, one extremity of each of said elements being enlarged and provided with flanges to engage adjacent spokes of said wheel, the other extremity of said elements being mutually inter-connected by a single fastening member beyond the extremity of said hub.

3. In an automobile extractor in combination with an automobile wheel and hub, a drum surrounding said hub, said drum being composed of a plurality of essentially similar elements, each element having one end thereof mounted between the spokes of said wheel, an elongated slot near the outer extremity of each of said elements, the outer extremity of said elements being mutually inter-secured by a bolt passing through said slot in each of said elements, each of said elements being composed of a single piece of material bent to a required configuration essentially as, and for the purpose described.

4. An automobile extractor comprised of a plurality of elements each element being formed from a single sheet of metal, said elements each comprising a body or shank, a head integral with said body, said head being cut to form a plurality of lobes and alined flanges connected by a medial member, said body being bent for a portion of its length in arcuate form, the outer extremity of said body being bent into essential parallelism with said lobes and flanges and provided with a slot or opening for the reception of a clamping member.

In testimony whereof I have signed my name to this specification in the presence of two subscribing witnesses.

VICTOR L. ROBERTSON.

Witnesses:
B. H. MILLER,
R. D. THATCHER.